(12) United States Patent
Chen

(10) Patent No.: US 9,240,038 B2
(45) Date of Patent: Jan. 19, 2016

(54) METHOD AND APPARATUS FOR ACQUIRING WEIGHT COEFFICIENT OF DIGITAL FILTER

(71) Applicant: Huawei Technologies Co., LTD, Shenzhen (CN)

(72) Inventor: Hai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 13/892,119

(22) Filed: May 10, 2013

(65) Prior Publication Data

US 2013/0322782 A1   Dec. 5, 2013

(30) Foreign Application Priority Data

May 11, 2012   (CN) ............................ 2012 1 0145460

(51) Int. Cl.
*G06T 5/10* (2006.01)
*G06T 5/00* (2006.01)

(52) U.S. Cl.
CPC . *G06T 5/10* (2013.01); *G06T 5/002* (2013.01); *G06T 2207/20021* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 4,636,862 A | * | 1/1987 | Hatori | G06T 7/2013 348/420.1 |
| 5,006,929 A | * | 4/1991 | Barbero et al. | 375/240.24 |
| 6,597,995 B1 | * | 7/2003 | Cornu et al. | 702/17 |
| 6,757,442 B1 | * | 6/2004 | Avinash | 382/274 |
| 7,203,371 B2 | | 4/2007 | Simard et al. | |
| 7,250,966 B1 | * | 7/2007 | Engelsberg | 348/208.3 |
| 7,356,082 B1 | * | 4/2008 | Kuhn | G06F 17/30811 348/699 |
| 7,400,780 B2 | * | 7/2008 | Kim | H04N 19/00 375/240.27 |
| 7,577,202 B2 | * | 8/2009 | Monro | H04N 19/537 375/240.16 |
| 2006/0232823 A1 | * | 10/2006 | Hooper | 358/3.27 |
| 2007/0098086 A1 | * | 5/2007 | Bhaskaran | 375/240.27 |
| 2008/0095431 A1 | * | 4/2008 | Ishiga | 382/167 |
| 2012/0044989 A1 | * | 2/2012 | Ahuja et al. | 375/240.03 |
| 2014/0301649 A1 | * | 10/2014 | Zhang et al. | 382/199 |

FOREIGN PATENT DOCUMENTS

CN   102509269 A   6/2012
EP   1074938 A2   2/2001

OTHER PUBLICATIONS

Qi, L., et al., "Image denoising of CW THz images by use of non-local mean," Infrared and Laser Engineering, vol. 41 No. 2, Feb. 2012, 6 pages.

\* cited by examiner

*Primary Examiner* — Michelle Entezari
(74) *Attorney, Agent, or Firm* — Slater & Matsil, L.L.P.

(57) ABSTRACT

Embodiments of the present invention provide a method and an apparatus for acquiring a weight coefficient of a digital filter so as to enhance a processing effect of images or videos and reduce the complexity of operations. The method includes: extracting global block features and local block features of image blocks, where the image blocks include a first image block and a second image block; acquiring an image block distance $f_s$ between the first image block and the second image block according to a global block feature and local block features of the first image block as well as a global block feature and local block features of the second image block; and evaluating a value of $e^{f_{s/\theta}^2}$.

20 Claims, 7 Drawing Sheets

| 106 | 191 | 21 | 107 | 190 |
| --- | --- | --- | --- | --- |
| 72 | 157 | 242 | 72 | 157 |
| 38 | 123 | 208 | 40 | 121 |
| 4 | 89 | 174 | 14 | 79 |
| 225 | 55 | 140 | 224 | 56 |

| 110 | 80 | 119 | 225 | 190 |
|---|---|---|---|---|
| 250 | 71 | 200 | 120 | 24 |
| 160 | 59 | 230 | 75 | 112 |
| 168 | 17 | 254 | 10 | 98 |
| 210 | 55 | 197 | 89 | 170 |

FIG. 2b

| 0 | 1 | 0 | 0 | 1 |
|---|---|---|---|---|
| 0 | 1 | 1 | 0 | 1 |
| 0 | 1 | 1 | 0 | 1 |
| 0 | 0 | 1 | 0 | 0 |
| 1 | 0 | 1 | 1 | 0 |

FIG. 3a

| 0 | 0 | 0 | 1 | 1 |
|---|---|---|---|---|
| 1 | 0 | 1 | 0 | 0 |
| 1 | 0 | 1 | 0 | 0 |
| 1 | 0 | 1 | 0 | 0 |
| 1 | 0 | 1 | 0 | 1 |

FIG. 3b

| | | | | |
|---|---|---|---|---|
| 1 | 0 | 0 | 1 | 0 |
| 0 | 0 | 0 | 0 | 0 |
| 0 | 1 | 0 | 0 | 1 |
| 0 | 0 | 0 | 0 | 0 |
| 0 | 0 | 0 | 0 | 0 |

FIG. 4a

| | | | | |
|---|---|---|---|---|
| 1 | 0 | 1 | 0 | 0 |
| 0 | 0 | 0 | 1 | 0 |
| 1 | 0 | 0 | 0 | 1 |
| 0 | 0 | 0 | 0 | 0 |
| 0 | 0 | 0 | 0 | 0 |

FIG. 4b

| | | |
|---|---|---|
|  | 131.5 |  |
| 80.5 | 208 | 131.5 |
|  | 157 |  |

FIG. 5a

|   | 1 |   |
|---|---|---|
| 0 | 1 | 0 |
|   | 1 |   |

FIG. 5b

|   | 1 |   |
|---|---|---|
| 0 | 0 | 0 |
|   | 0 |   |

FIG. 5c

|   | 159.5 |   |
|---|---|---|
| 109.5 | 230 | 93.5 |
|   | 225.5 |   |

FIG. 6a

|   | 1 |   |
|---|---|---|
| 0 | 1 | 0 |
|   | 1 |   |

FIG. 6b

|   | 0 |   |
|---|---|---|
| 0 | 1 | 1 |
|   | 1 |   |
FIG. 6c
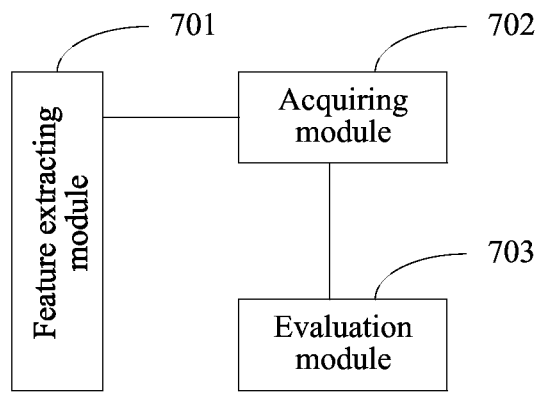
FIG. 7
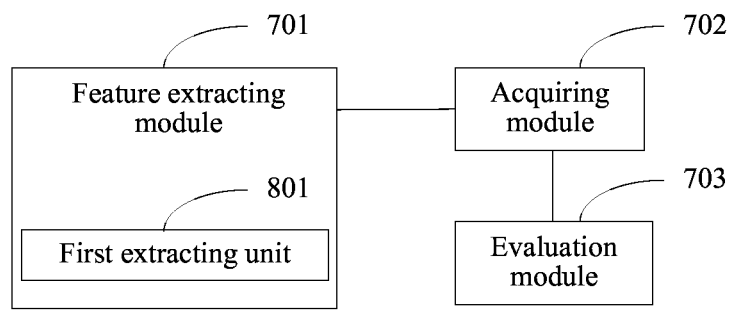
FIG. 8

METHOD AND APPARATUS FOR ACQUIRING WEIGHT COEFFICIENT OF DIGITAL FILTER

CROSS-REFERENCE TO RELATED APPLICATION

This application claims priority to Chinese Patent Application No. 201210145460.4, filed on May 11, 2012, which is hereby incorporated by reference in its entirety.

FIELD OF THE INVENTION

The present invention relates to the image processing field, and in particular to a method and an apparatus for acquiring a weight coefficient of a digital filter.

BACKGROUND OF THE INVENTION

A digital filter is widely applied in the image or video field, mainly for pre-processing, post-processing, and special effect processing of images or videos. In an application of pre-processing of images or videos, the digital filter may be used for demosaicking0 color interpolation to suppress imaging noise, and may also be used for enhancing important details such as image corner angles. In an application of post-processing of images or videos, the digital filter may be used for image zooming, image de-interlacing, post-processing noise reduction enhancement, and the like. In an application of special effect processing of images or videos, the digital filter may also be used for dynamic range compression (Dynamic Range Compression, DRC), image cartoon processing, painting processing, and the like of high dynamic range (High Dynamic Range, HDR) images.

In general, a digital filter used for smoothing or noise reduction may be expressed by a mathematical formula as follows:

$$Y_i = \frac{\sum_{j \in \delta_i}^{j} \omega_{ij} I_j}{\sum_{j \in \delta_i}^{j} \omega_{ij}}$$

where i is a current pixel coordinate, $Y_i$ is an output pixel value, $I_j$ is an original image pixel value, $\delta_i$ is a neighborhood of a pixel position i and may be a one-dimensional, two-dimensional, or multi-dimensional space, and $\omega_{ij}$ is a weight coefficient of the digital filter. A selection rule of the weight coefficient $\omega_{ij}$ determines the quality of the digital filter. Therefore, calculation about a weight coefficient of a digital filter is a relatively important issue.

In the prior art, a linear filter such as a common low-pass filter, a band-pass filter, or a high-pass filter usually uses space coordinates of pixels to calculate its own weight coefficient, that is, $\omega_{ij} = f(i, j)$.

In the prior art, the weight coefficient of the linear filter is a function of the space coordinates of the pixels. That is, the weight coefficient of the linear filter only relates to the space coordinates of the pixels, instead of adaptively changing according to image content (such as a strength value of an image). Therefore, when a weight coefficient calculated by using the foregoing method is used for noise reduction of an image or video, blur occurs at an edge of details in the image or video; and when the weight coefficient is used for enhancement of an image or video, an obvious phenomenon of going beyond occurs nearby an edge with a large contrast, that is, a white edge occurs.

SUMMARY OF THE INVENTION

Embodiments of the present invention provide a method and an apparatus for acquiring a weight coefficient of a digital filter so as to enhance a processing effect of images or videos and reduce the complexity of operations.

An embodiment of the present invention provides a method for acquiring a weight coefficient of a digital filter. The method includes:

extracting global block features and local block features of image blocks, where the image blocks include a first image block and a second image block, the first image block is an image block that currently a digital filter needs to process, and the second image block is an image block in which a neighborhood of the first image block lies;

acquiring an image block distance $f_s$ between the first image block and the second image block according to a global block feature and local block features of the first image block as well as a global block feature and local block features of the second image block; and evaluating a value of $$e^{-\frac{f_s}{\theta^2}}$$

and using the $$e^{-\frac{f_s}{\theta^2}}$$

as a weight coefficient of the digital filter, where the θ is a parameter of the digital filter.

Optionally, the extracting global block features of image blocks includes: calculating average strength $f_{1i}$ of the first image block and average strength $f_{1j}$ of the second image block, and using the $f_{1i}$ and the $f_{1j}$ as the global block feature of the first image block and the global block feature of the second image block, respectively.

Optionally, the extracting local block features of image blocks includes: comparing a strength value of each pixel in the first image block and the $f_{1i}$, and using two-valued logic "0"s or "1"s, obtained according to the result of the comparison, as a first local block feature $f_{2i}$ of the first image block; comparing a strength value of each pixel in the second image block and the $f_{1j}$, and using two-valued logic "0"s or "1"s, obtained through the comparison, as a first local block feature $f_{2j}$ of the second image block; determining whether an absolute difference between the strength value of each pixel in the first image block and the $f_{1i}$ is smaller than a first threshold, and using two-valued logic "0"s or "1"s, obtained through the determination, as a second local block feature $f_{3i}$ of the first image block; and determining whether an absolute difference between the strength value of each pixel in the second image block and the $f_{1j}$ is smaller than a second threshold, and using two-valued logic "0"s or "1"s, obtained through the determination, as a second local block feature $f_{3j}$ of the second image block.

Optionally, the extracting local block features of image blocks includes: calculating, by using a certain pixel among pixels contained in the first image block as a central pixel, average strength of pixels in each direction of the central pixel to obtain a first group of strength values; calculating, by using a certain pixel among pixels contained in the second image block as a central pixel, average strength of pixels in each direction of the central pixel to obtain a second group of strength values; comparing each strength value among the first group of strength values and the $f_{1i}$, and using two-valued logic "0"s or "1"s, obtained according to the result of the comparison, as a first local block feature $f_{2i}$ of the first image block; comparing each strength value among the second group of strength values and the $f_{1j}$, and using two-valued logic "0"s or "1"s, obtained according to the result of the comparison, as a first local block feature $f_{2j}$ of the second image block; determining whether an absolute difference between each strength value among the first group of strength values and the $f_{1i}$ is smaller than a first threshold, and using two-valued logic "0"s or "1"s, obtained through the determination, as a second local block feature $f_{3i}$ of the first image block; and determining whether an absolute difference between each strength value among the second group of strength values and the $f_{1j}$ is smaller than a second threshold, and using two-valued logic "0"s or "1"s, obtained through the determination, as a second local block feature $f_{3j}$ of the second image block.

Optionally, the acquiring an image block distance $f_s$ between the first image block and the second image block according to a global block feature and local block features of the first image block as well as a global block feature and local block features of the second image block includes: calculating the number of two-valued logic "1"s $C_{bit}$ obtained after a relational operation $(f_{2i} \wedge f_{2j})$ & $(f_{3i}|f_{3j})$ is performed on the $f_{2i}$, $f_{2j}$, $f_{3i}$, and $f_{3j}$; evaluating a product of $|f_{1i}-f_{1j}|$ and the $C_{bit}$; and using the product as the image block distance $f_s$ between the first image block and the second image block, where $|f_{1i}-f_{1j}|$ indicates an absolute value of $f_{1i}-f_{1j}$.

An embodiment of the present invention provides an apparatus for acquiring a weight coefficient of a digital filter. The apparatus includes:

a feature extracting module, configured to extract global block features and local block features of image blocks, where the image blocks include a first image block and a second image block, the first image block is an image block that currently a digital filter needs to process, and the second image block is an image block in which a neighborhood of the first image block lies;

an acquiring module, configured to acquire an image block distance $f_s$ between the first image block and the second image block according to a global block feature and local block features of the first image block as well as a global block feature and local block features of the second image block; and an evaluation module, configured to evaluate a value of $$e^{-\frac{f_s}{\theta^2}}$$

and use the $$e^{-\frac{f_s}{\theta^2}}$$

as a weight coefficient of the digital filter, where the $\theta$ is a parameter of the digital filter.

Optionally, the feature extracting module includes: a first extracting unit, configured to calculate average strength $f_{1i}$ of the first image block and average strength $f_{1j}$ of the second image block, and use the $f_{1i}$ and the $f_{1j}$ as the global block feature of the first image block and the global block feature of the second image block, respectively.

Optionally, the feature extracting module further includes: a second extracting unit, configured to compare a strength value of each pixel in the first image block and the $f_{1i}$, and use two-valued logic "0"s or "1"s, obtained according to the result of the comparison, as a first local block feature $f_{2i}$ of the first image block; and compare a strength value of each pixel in the second image block and the $f_{1j}$, and use two-valued logic "0"s or "1"s, obtained according to the result of the comparison, as a first local block feature $f_{2j}$ of the second image block; and a third extracting unit, configured to determine whether an absolute difference between the strength value of each pixel in the first image block and the $f_{1i}$ is smaller than a first threshold, and use two-valued logic "0"s or "1"s, obtained through the determination, as a second local block feature $f_{3i}$ of the first image block; and determine whether an absolute difference between the strength value of each pixel in the second image block and the $f_{1j}$ is smaller than a second threshold, and use two-valued logic "0"s or "1"s, obtained through the determination, as a second local block feature $f_{3j}$ of the second image block.

Optionally, the feature extracting module further includes: a calculating unit, configured to calculate, by using a certain pixel among pixels contained in the first image block as a central pixel, average strength of pixels in each direction of the central pixel to obtain a first group of strength values; and calculate, by using a certain pixel among pixels contained in the second image block as a central pixel, average strength of pixels in each direction of the central pixel to obtain a second group of strength values; a fourth extracting unit, configured to compare each strength value among the first group of strength values and the $f_{1i}$, and use two-valued logic "0"s or "1"s, obtained according to the result of the comparison, as a first local block feature $f_{2i}$ of the first image block; and compare each strength value among the second group of strength values and the $f_{1j}$, and use two-valued logic "0"s or "1"s, obtained according to the result of the comparison, as a first local block feature $f_{2j}$ of the second image block; and a fifth extracting unit, configured to determine whether an absolute difference between each strength value among the first group of strength values and the $f_{1i}$ is smaller than a first threshold, and use two-valued logic "0"s or "1"s, obtained through the determination, as a second local block feature $f_{3i}$ of the first image block; and determine whether an absolute difference between each strength value among the second group of strength values and the $f_{1j}$ is smaller than a second threshold, and use two-valued logic "0"s or "1"s, obtained through the determination, as a second local block feature $f_{3j}$ of the second image block.

Optionally, the acquiring module includes: a counting unit, configured to calculate the number of two-valued logic "1"s $C_{bit}$ obtained after a relational operation $(f_{2i} \wedge f_{2j})$ & $(f_{3i}|f_{3j})$ is performed on the $f_{2i}$, $f_{2j}$, $f_{3i}$, and $f_{3j}$; and an evaluation unit, configured to evaluate a product of $|f_{1i}-f_{1j}|$ and the $C_{bit}$, and use the product as the image block distance $f_s$ between the first image block and the second image block, where $|f_{1i}-f_{1j}|$ indicates an absolute value of $f_{1i}-f_{1j}$.

As can be seen from the foregoing embodiments of the present invention, an image block distance between two image blocks is acquired according to acquired global block features and local block features of the image blocks, and then a weight coefficient of a digital filter is evaluated according to the image block distance. Therefore, compared with the prior art, the method for acquiring a weight coefficient of a digital filter provided by the embodiment of the present invention enables a digital filter to perform self-adaptation according to image content and effectively utilize internal redundant texture information of an image block. At the time of smoothing and noise reduction, noise of a flat area can be effectively eliminated and details such as edges are reserved. When the digital filter is used for image enhancement and dynamic range compression, sharp edge details may be enhanced or reserved and a side effect such as a white edge or a black edge does not occur.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following descriptions show merely some embodiments of the present invention, and persons of skill in the art may still derive other drawings from these accompanying drawings.

FIG. 2b is a schematic diagram of a global block feature of a second image block according to an embodiment of the present invention;

FIG. 3a is a schematic diagram of a first local block feature of a first image block according to an embodiment of the present invention;

FIG. 3b is a schematic diagram of a first local block feature of a second image block according to an embodiment of the present invention;

FIG. 4a is a schematic diagram of a second local block feature of a first image block according to an embodiment of the present invention;

FIG. 4b is a schematic diagram of a second local block feature of a second image block according to an embodiment of the present invention;

FIG. 5a is a schematic diagram of a first group of strength values of the first image block illustrated in FIG. 2a according to an embodiment of the present invention, where the first group of strength values of the first image block is calculated according to five directions;

FIG. 5b is a schematic diagram of a first local block feature of a first image block, where the first local block feature of the first image block is obtained according to the illustration in FIG. 5a;

FIG. 5c is a schematic diagram of a second local block feature of a first image block, where the second local block feature of the first image block is obtained according to the illustration in FIG. 5a;

FIG. 6a is a schematic diagram of a second group of strength values of the second image block illustrated in FIG. 2b according to an embodiment of the present invention, where the second group of strength values of the second image block is calculated according to five directions;

FIG. 6b is a schematic diagram of a first local block feature of the second image block, where the first local block feature of the second image block is obtained according to the illustration in FIG. 6a;

FIG. 6c is a schematic diagram of a second local block feature of the second image block, where the second local block feature of the second image block is obtained according to the illustration in FIG. 6a;

FIG. 7 is a schematic structural diagram of an apparatus for acquiring a weight coefficient of a digital filter according to an embodiment of the present invention;

FIG. 8 is a schematic structural diagram of an apparatus for acquiring a weight coefficient of a digital filter according to another embodiment of the present invention;

DETAILED DESCRIPTION OF THE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention shall fall within the protection scope of the present invention.

Figures 1, 2A:
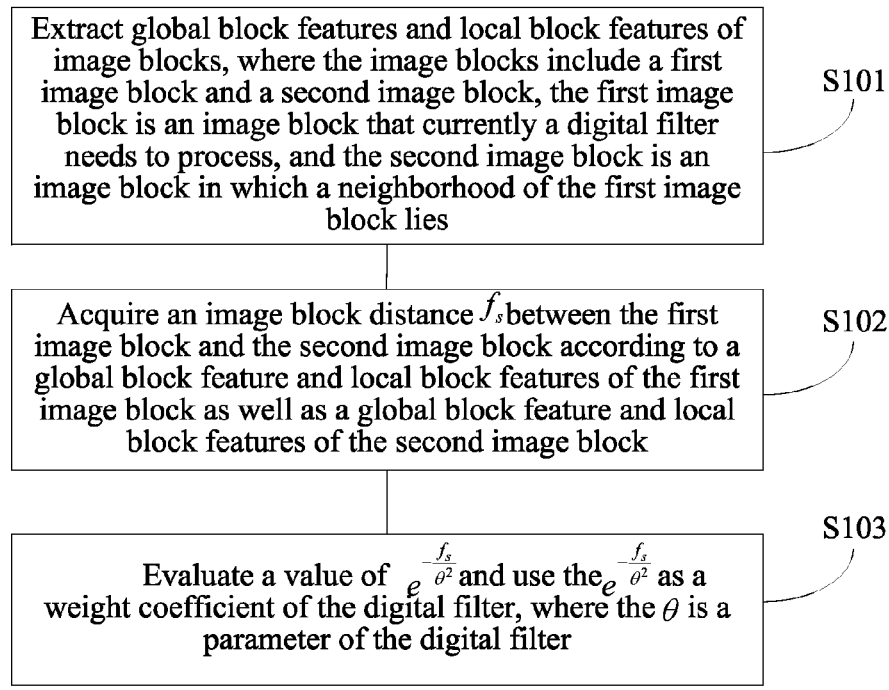
FIG. 1 is a schematic flowchart of a method for acquiring a weight coefficient of a digital filter according to an embodiment of the present invention.
FIG. 2a is a schematic diagram of a global block feature of a first image block according to an embodiment of the present invention.

Refer to FIG. 1, which is a schematic flowchart of a method for acquiring a weight coefficient of a digital filter according to an embodiment of the present invention. The method mainly includes steps S101, S102, and S103:

S101. Extract global block features and local block features of image blocks.

In the embodiment of the present invention, when a weight coefficient of a digital filter is acquired, two image blocks are involved. One is an image block that currently the digital filter needs to process, and the other is an image block in which a neighborhood of the image block that currently the digital filter needs to process lies. For ease of description, here, the image block that currently the digital filter needs to process is called a first image block, and the image block in which a neighborhood of the first image block lies is called a second image block.

A global block feature of an image block may be represented by average strength (or weighted average strength) of the image block, intermediate strength of the image block, a strength value of a specific position in the image block, or the like. As an embodiment of the present invention, average strength of the first image block and average strength of the second image block may be calculated, and the average strength of the first image block and the average strength of the second image block may be used as a global block feature of the first image block and a global block feature of the second image block, respectively. For ease of description, the average strength of the first image block is marked as $f_{1,i}$, and the average strength of the second image block is marked as $f_{1,j}$. Average strength of an image block may be indicated by an average strength value of pixels contained in the image block. It is assumed that the first image block is an image block that contains 5×5 pixels, as shown in FIG. 2a. A number in a small box in FIG. 2a indicates a strength value of a pixel. Then according to the foregoing definition of the average strength of the image block, the average strength of the first image block illustrated in FIG. 2a, that is, the global block feature of the first image block, is 116.2; similarly, the second image block illustrated in FIG. 2b, that is, the image block in which a neighborhood of the first image block illustrated in FIG. 2a lies, is an image block that contains 5×5 pixels, and its global block feature is 131.72.

As an embodiment of extracting local block features of image blocks according to the present invention, a strength value of each pixel in the first image block and the global block feature $f_{1i}$ of the first image block may be compared, and two-valued logic "0"s or "1"s obtained according to the result of the comparison may be used as a first local block feature $f_{2i}$ of the first image block; and a strength value of each pixel in the second image block and the global block feature $f_{1j}$ of the second image block may be compared, and two-valued logic "0"s or "1"s obtained according to the result of the comparison may be used as a first local block feature $f_{2j}$ of the second image block. For ease of description, the first local block feature of the first image block is marked as $f_{2i}$, and the first local block feature of the second image block is marked as $f_{2j}$.

For example, for the first image block illustrated in FIG. 2a, if the strength value of a pixel in the first image block is larger than the global block feature 116.2 of the first image block, a two-valued logic "1" is used to indicate a comparison result; and if the strength value of a pixel in the first image block is smaller than the global block feature 116.2 of the first image block, a two-valued logic "0" is used to indicate a comparison result. Then the first local block feature $f_{2i}$ of the first image block illustrated in FIG. 2a may be indicated by FIG. 3a. Similarly, for the second image block illustrated in FIG. 2b, if the strength value of a pixel in the second image block is larger than the global block feature 131.72 of the second image block, a two-valued logic "1" is used to indicate a comparison result; and if the strength value of a pixel in the second image block is smaller than the global block feature 131.72 of the second image block, a two-valued logic "0" is used to indicate a comparison result. Then the first local block feature $f_{2j}$ of the second image block illustrated in FIG. 2b may be indicated by FIG. 3b.

As another embodiment of extracting local block features of image blocks according to the present invention, it may be determined whether an absolute difference between the strength value of each pixel in the first image block and the global block feature $f_{1i}$ of the first image block is smaller than a first threshold, and two-valued logic "0"s or "1"s obtained through the determination may be used as a second local block feature of the first image block; and it may be determined whether an absolute difference between the strength value of each pixel in the second image block and the $f_{1j}$ is smaller than a second threshold, and two-valued logic "0"s or "1"s, obtained through the determination may be used as a second local block feature of the second image block. For ease of description, the second local block feature of the first image block is marked as $f_{3i}$, and the second local block feature of the second image block is marked as $f_j$.

For example, for the first image block illustrated in FIG. 2a, if an absolute difference between the strength value of each pixel in the first image block and the global block feature 116.2 of the first image block is smaller than a first threshold 16, a two-valued logic "1" is used to indicate a comparison result; and if an absolute difference between the strength value of each pixel in the first image block and the global block feature 116.2 of the first image block is larger than the first threshold 16, a two-valued logic "0" is used to indicate a comparison result. Then the second local block feature $f_{3i}$ of the first image block illustrated in FIG. 2a may be indicated by FIG. 4a. Similarly, for the second image block illustrated in FIG. 2b, if an absolute difference between the strength value of each pixel in the second image block and the global block feature 131.72 of the second image block is smaller than a second threshold 30, a two-valued logic "1" is used to indicate a comparison result; and if an absolute difference between the strength value of each pixel in the second image block and the global block feature 131.72 of the second image block is larger than the second threshold 30, a two-valued logic "0" is used to indicate a comparison result. Then the second local block feature $f_{3j}$ of the second image block illustrated in FIG. 2b may be indicated by FIG. 4b.

For an image block that contains more pixels, if methods illustrated in FIG. 3a to FIG. 4b are still used to extract a global block feature and/or a local block feature, a larger number of bits are inevitably needed for indication and this is a kind of resource consumption. To save a resource, as another embodiment of extracting local block features of image blocks according to the present invention the following manner may be adopted:

calculating, by using a certain pixel among pixels contained in the first image block as a central pixel, average strength of pixels in each direction of the central pixel to obtain a first group of strength values; and calculating, by using a certain pixel among pixels contained in the second image block as a central pixel, average strength of pixels in each direction of the central pixel to obtain a second group of strength values;

comparing each strength value among the first group of strength values and the global block feature $f_{1i}$ of the first image block, and using two-valued logic "0"s or "1"s, obtained according to the result of the comparison, as a first local block feature $f_{2i}$ of the first image block; and comparing each strength value among the second group of strength values and the global block feature $f_{1j}$ of the second image block, and using two-valued logic "0"s or "1"s, obtained according to the result of the comparison, as a first local block feature $f_{2j}$ of the second image block; and determining whether an absolute difference between each strength value among the first group of strength values and the global block feature $f_{1i}$ of the first image block is smaller than a first threshold, and using two-valued logic "0"s or "1"s, obtained through the determination, as a second local block feature $f_{3i}$ of the first image block; and determining whether an absolute difference between each strength value among the second group of strength values and the global block feature $f_{1j}$ of the second image block is smaller than a second threshold, and using two-valued logic "0"s or "1"s, obtained through the determination, as a second local block feature $f_{3j}$ of the second image block.

For example, for the first image block illustrated in FIG. 2a, average strength of pixels in five directions may be calculated by using a pixel whose strength value is 208 as a central pixel, that is, average strength of two pixels adjacent to the pixel whose strength value is 208 in a 12 o'clock direction is calculated to obtain a strength value 131.5; average strength of two pixels adjacent to the pixel whose strength value is 208 in a 3 o'clock direction is calculated to obtain a strength value 80.5; average strength of two pixels adjacent to the pixel whose strength value is 208 in a 6 o'clock direction is calculated to obtain a strength value 157; and average strength of two pixels adjacent to the pixel whose strength value is 208 in a 9 o'clock direction is calculated to obtain a strength value 80.5. FIG. 5a shows a first group of strength values of the first image block illustrated in FIG. 2a, where the first group of strength values of the first image block is calculated according to the five directions.

It should be noted that, the calculating, by using a certain pixel as a central pixel, average strength of pixels in each direction of the central pixel is not limited to the five directions illustrated in FIG. 5a, and other directions such as nine directions may also be selected according to a requirement for calculation precision of average strength; the more directions there are, the higher the precision of calculated average strength is.

After the first group of strength values of the first image block illustrated in FIG. 2a is calculated according to the five directions, each strength value among the first group of strength values and the global block feature 116.2 of the first image block may be compared. If a strength value among the first group of strength values is larger than the global block feature 116.2 of the first image block, a two-valued logic "1" is used for indication. If a strength value among the first group of strength values is smaller than the global block feature 116.2 of the first image block, a two-valued logic "0" is used for indication. FIG. 5b shows a schematic diagram of a first local block feature $f_{2i}$ of the first image block, where the first local block feature $f_{2i}$ of the first image block is obtained according to FIG. 5a.

After the first group of strength values of the first image block illustrated in FIG. 2a is calculated according to the five directions, it may be determined whether an absolute difference between each strength value among the first group of strength values and the global block feature 116.2 of the first image block is smaller than the first threshold 16. If the absolute difference between a strength value among the first group of strength values and the global block feature 116.2 of the first image block is smaller than the first threshold 16, a two-valued logic "1" is used for indication. If the absolute difference between a strength value among the first group of strength values and the global block feature 116.2 of the first image block is larger than the first threshold 16, a two-valued logic "0" is used for indication. FIG. 5c shows a schematic diagram of a second local block feature $f_{3i}$ of the first image block, where the second local block feature $f_{3i}$ of the first image block is obtained according to FIG. 5a.

For another example, for the second image block illustrated in FIG. 2b, average strength of pixels in five directions may be calculated by using a pixel whose strength value is 230 as a central pixel, that is, average strength of two pixels adjacent to the pixel whose strength value is 230 in a 12 o'clock direction is calculated to obtain a strength value 159.5; average strength of two pixels adjacent to the pixel whose strength value is 230 in a 3 o'clock direction is calculated to obtain a strength value 93.5; average strength of two pixels adjacent to the pixel whose strength value is 230 in a 6 o'clock direction is calculated to obtain a strength value 225.5; and average strength of two pixels adjacent to the pixel whose strength value is 230 in a 9 o'clock direction is calculated to obtain a strength value 109.5. FIG. 6a shows a second group of strength values of the second image block illustrated in FIG. 2b, where the second group of strength values of the second image block is calculated according to the five directions.

After the second group of strength values of the second image block illustrated in FIG. 2b is calculated according to the five directions, each strength value among the second group of strength values and the global block feature 131.72 of the second image block may be compared. If a strength value among the second group of strength values is larger than the global block feature 131.72 of the second image block, a two-valued logic "1" is used for indication. If a strength value among the second group of strength values is smaller than the global block feature 131.72 of the second image block, a two-valued logic "0" is used for indication. FIG. 6b shows a schematic diagram of a first local block feature $f_{2j}$ of the second image block, where the first local block feature $f_{2j}$ of the second image block is obtained according to FIG. 6a.

After the second group of strength values of the second image block illustrated in FIG. 2b is calculated according to the five directions, it may be determined whether an absolute difference between each strength value among the second group of strength values and the global block feature 131.72 of the second image block is smaller than the second threshold 30. If the absolute difference between a strength value among the second group of strength values and the global block feature 131.72 of the second image block is smaller than the second threshold 30, a two-valued logic "1" is used for indication. If the absolute difference between a strength value among the second group of strength values and the global block feature 131.72 of the second image block is larger than the second threshold 30, a two-valued logic "0" is used for indication. FIG. 6c shows a schematic diagram of a second local block feature $f_{3j}$ of the second image block, where the second local block feature $f_{3j}$ of the second image block is obtained according to FIG. 6a.

S102. Acquire an image block distance $f_s$ between the first image block and the second image block according to the global block feature and local block features of the first image block as well as the global block feature and local block features of the second image block.

An image block distance is a parameter used to represent a degree of similarity between two image blocks. A shorter image block distance indicates that the two image blocks are more similar. In the prior art, a European method for calculating an image block distance is used to calculate an image block distance. That is, a sum of squares of differences between strength values of all pixels of one image block and strength values of corresponding pixels of the other image block is calculated. The European method for calculating an image block distance is highly complex, consumes a large number of resources, and results in a high cost when it is directly implemented. In addition, when the European method for calculating an image block distance is used to calculate a weight coefficient of a digital filter, an exponential operation and a large divisor operation are involved, thereby bringing calculation complexity.

What is different from the prior art is that, in the present invention, when the image block distance between the first image block and the second image block is acquired, the following relational operation is first performed on the first local block feature $f_{2i}$ of the first image block, the first local block feature $f_{2j}$ of the second image block, the second local block feature $f_{3i}$ of the first image block, and the second local block feature of the $f_{3j}$ of the second image block, which are extracted in step S102:

$$(f_{2i} \wedge f_{2j}) \& (f_{3i} | f_{3j}) \qquad \text{Formula (1)}$$

where "∧" indicates an "exclusive or" operation, "&" indicates an "and" operation, and "|" indicates an "or" operation. Then the number of two-valued logic "1"s in Formula (1) is calculated, and the number of two-valued logic "1"s in Formula (1) is marked as $C_{bit}$.

As an embodiment of the present invention, when the number of two-valued logic "1"s in Formula (1) is calculated, an instruction bitcnt( ) may be used for implementation. Running the instruction bitcnt( ) is actually counting the number of bits "1"s in an operand. In the embodiment of the present invention, $C_{bit}$=bitcnt$((f_{2i} \wedge f_{2j}) \& (f_{3i}|f_{3j}))$.

After the number of two-valued logic "1"s in $(f_{2i} \wedge f_{2j}) \& (f_{3i}|f_{3j})$ are calculated, a product $|f_{1i}-f_{1j}| \times (f_{2i} \wedge f_{2j}) \& (f_{3i}|f_{3j})$ of $|f_{1i}-f_{1j}|$ and $C_{bit}$ is further evaluated, and the product is used as the image block distance $f_s$ between the first image block and the second image block, where $|f_{1i}-f_{1j}|$ indicates an absolute value of $f_{1i}-f_{1j}$.

A CPU, an ARM, a GPU or the like may all finish executing the instruction bitcnt( ) in one clock period, and the large divisor operation and exponential operation are not involved. Therefore, the method for acquiring an image block distance provided by the embodiment of the present invention has very low complexity and may be implemented at a low cost on a chip and smart mobile phone software.

S103: Evaluate a value of $$e^{-\frac{f_s}{\theta^2}}$$

and use the $$e^{-\frac{f_s}{\theta^2}}$$

as a weight coefficient of the digital filter, where the θ is a parameter of the digital filter; the larger the value of θ is, the more obvious the image filtering effect is.

That is, a weight coefficient $\omega_{ij}$ is expressed as follows:

$$\omega_{ij} = e^{-\frac{f_s}{\theta^2}} = e^{-\frac{|f_{1i}-f_{1j}|*(f_{2i} \wedge f_{2j}) \& (f_{3i}|f_{3j})}{\theta^2}} \quad \text{Formula (2)}$$

In fact, Formula (2) is to convert the local features into an amplification factor of the image block distance, so that the image block distance contains the global block features and local block features of the image blocks, where e is a natural base number and may be a value such as 2.71828.

As can be seen from the method for acquiring a weight coefficient of a digital filter provided by the embodiment of the present invention, an image block distance between two image blocks is acquired according to acquired global block features and local block features of the image blocks, and then a weight coefficient of a digital filter is evaluated according to the image block distance. Therefore, compared with the prior art, the method for acquiring a weight coefficient of a digital filter according to the embodiment of the present invention enables a digital filter to perform self-adaptation according to image content and effectively utilize internal redundant texture information of an image block. At the time of smoothing and noise reduction, noise of a flat area can be effectively eliminated and details such as edges are reserved. When used for image enhancement and dynamic range compression, sharp edge details may be enhanced or reserved and a side effect such as a white edge or a black edge does not occur.

Refer to FIG. 7, which is a schematic structural diagram of an apparatus for acquiring a weight coefficient of a digital filter according to an embodiment of the present invention. For ease of description, only parts related to the embodiment of the present invention are shown. The apparatus for acquiring a weight coefficient of a digital filter illustrated in FIG. 7 includes a feature extracting module 701, an acquiring module 702, and an evaluation module 703, where:

a feature extracting module 701, configured to extract global block features and local block features of image blocks, where the image blocks include a first image block and a second image block, the first image block is an image block that currently a digital filter needs to process, and the second image block is an image block in which a neighborhood of the first image block lies;

an acquiring module 702, configured to acquire an image block distance $f_s$ between the first image block and the second image block according to a global block feature and local block features of the first image block as well as a global block feature and local block features of the second image block; and an evaluation module 703, configured to evaluate a value of $$e^{-\frac{f_s}{\theta^2}}$$

and use the $$e^{-\frac{f_s}{\theta^2}}$$

as a weight coefficient of the digital filter, where the θ is a parameter of the digital filter, and the larger the value of θ, the more obvious the image filtering effect; and e is a natural base number and may be a value such as 2.71828 . . . .

It should be noted that, in an implementation manner of the apparatus for acquiring a weight coefficient of a digital filter, division of the functional modules is only an exemplary description, and in a practical application, the foregoing functions may be performed by different functional modules according to a requirement, for example, a configuration requirement of corresponding hardware or a consideration of facilitating software implementation. That is, the internal structure of the apparatus for acquiring a weight coefficient of a digital filter is divided into different functional modules so as to perform part or all of the functions described above. In addition, in the practical application, a corresponding functional module in this embodiment may be implemented by corresponding hardware, and may also be completed by corresponding hardware executing corresponding software. For example, the feature extracting module may be hardware that has the function of extracting global block features and local block features of image blocks, such as a feature extractor; and may also be a general processor or another hardware device that is able to execute a corresponding computer program so as to perform the foregoing function. For another example, the acquiring module may be hardware that has the function of acquiring an image block distance $f_s$ between the first image block and the second image block according to a global block feature and local block features of the first image block as well as a global block feature and local block features of the second image block, such as an acquiring unit, and may also be a general processor or another hardware device that is capable of executing a corresponding computer program so as to perform the foregoing function (and the principle described above may be applied to all embodiments provided in this specification).

When a weight coefficient of a digital filter is acquired, two image blocks are involved. One is an image block that currently the digital filter needs to process, and the other is an image block in which a neighborhood of the image block that currently the digital filter needs to process lies. For ease of description, here the image block that currently the digital filter needs to process is called a first image block, and the image block in which a neighborhood of the first image block lies is called a second image block.

A global block feature of an image block may be represented by average strength (or weighted average strength) of the image block, intermediate strength of the image block, or a strength value of a specific position in the image block. In the apparatus for acquiring a weight coefficient of a digital filter illustrated in FIG. 7, the feature extracting module 701 may include a first extracting unit 801, as shown in FIG. 8, which shows an apparatus for acquiring a weight coefficient of a digital filter according to another embodiment of the present invention. The first extracting unit 801 calculates average strength of the first image block and average strength of the second image block, and uses the average strength of the first image block and the average strength of the second image block as the global block feature of the first image block and the global block feature of the second image block, respectively. For ease of description, the average strength of the first image block is marked as $f_{1i}$, and the average strength of the second image block is marked as $f_{1j}$. Average strength of an image block may be indicated by an average strength value of pixels contained in the image block. It is assumed that the first image block is an image block that contains 5×5 pixels, as shown in FIG. 2a. A number in a small box in FIG. 2a indicates a strength value of a pixel. Then according to the foregoing definition of the average strength of the image block, the average strength of the first image block illustrated in FIG. 2a, that is, the global block feature of the first image block, is 116.2; similarly, the second image block illustrated in FIG. 2b, that is, the image block in which a neighborhood of the first image block illustrated in FIG. 2a lies, is an image block that contains 5×5 pixels, and its global block feature is 131.72.

Figure 9:
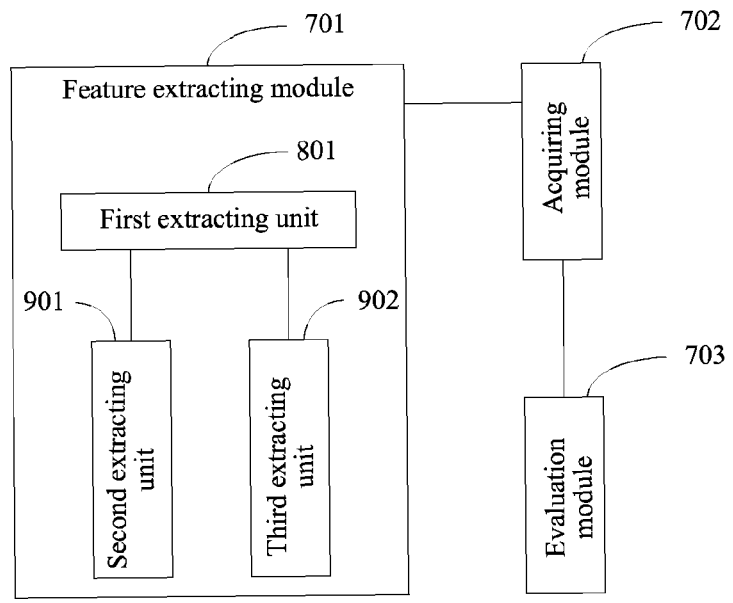
FIG. 9 is a schematic structural diagram of an apparatus for acquiring a weight coefficient of a digital filter according to another embodiment of the present invention.

In the apparatus for acquiring a weight coefficient of a digital filter illustrated in FIG. 8, the feature extracting module 701 may further include a second extracting unit 901 and a third extracting unit 902, as shown in FIG. 9, which shows an apparatus for acquiring a weight coefficient of a digital filter according to another embodiment of the present invention.

The second extracting unit 901 is configured to compare a strength value of each pixel in the first image block and the global block feature $f_{1i}$ of the first image block, and use two-valued logic "0"s or "1"s, obtained according to the result of the comparison, as a first local block feature $f_{2i}$ of the first image block; and compare a strength value of each pixel in the second image block and the global block feature $f_{1j}$ of the second image block, and use two-valued logic "0"s or "1"s, obtained according to the result of the comparison, as a first local block feature $f_{2j}$ of the second image block. For example, for the first image block illustrated in FIG. 2a, if the strength value of a pixel in the first image block is larger than the global block feature 116.2 of the first image block according to the comparison performed by the second extracting unit 901, a two-valued logic "1" is used to indicate a comparison result; and if the strength value of a pixel in the first image block is smaller than the global block feature 116.2 of the first image block, a two-valued logic "0" is used to indicate a comparison result. Then the first local block feature $f_{2i}$ of the first image block illustrated in FIG. 2a may be indicated by FIG. 3a. Similarly, for the second image block illustrated in FIG. 2b, if the strength value of a pixel in the second image block is larger than the global block feature 131.72 of the second image block according to the comparison performed by the second extracting unit 901, a two-valued logic "1" is used to indicate a comparison result; and if the strength value of a pixel in the second image block is smaller than the global block feature 131.72 of the second image block according to the comparison performed by the second extracting unit 901, a two-valued logic "0" is used to indicate a comparison result. Then the first local block feature $f_{2j}$ of the second image block illustrated in FIG. 2b may be indicated by FIG. 3b.

The third extracting unit 902 is configured to determine whether an absolute difference between the strength value of each pixel in the first image block and the global block feature $f_{1i}$ of the first image block is smaller than a first threshold, and use two-valued logic "0"s or "1"s, obtained through the determination, as a second local block feature $f_{3i}$ of the first image block; and determine whether an absolute difference between the strength value of each pixel in the second image block and the $f_{1j}$ of the second image block is smaller than a second threshold, and use two-valued logic "0"s or "1"s, obtained through the determination, as a second local block feature $f_{3j}$ of the second image block. For example, for the first image block illustrated in FIG. 2a, if an absolute difference between the strength value of each pixel in the first image block and the global block feature 116.2 of the first image block is smaller than the first threshold 16 according to the determination performed by the third extracting unit 902, a two-valued logic "1" is used to indicate a comparison result; and if an absolute difference between the strength value of each pixel in the first image block and the global block feature 116.2 of the first image block is larger than the first threshold 16 according to the determination performed by the third extracting unit 902, a two-valued logic "0" is used to indicate a comparison result. Then the second local block feature $f_{3i}$ of the first image block illustrated in FIG. 2a may be indicated by FIG. 4a. Similarly, for the second image block illustrated in FIG. 2b, if an absolute difference between the strength value of each pixel in the second image block and the global block feature 131.72 of the second image block is smaller than the second threshold 30 according to the determination performed by the third extracting unit 902, a two-valued logic "1" is used to indicate a comparison result; and if an absolute difference between the strength value of each pixel in the second image block and the global block feature 131.72 of the second image block is larger than the second threshold 30 according to the determination performed by the third extracting unit 902, a two-valued logic "0" is used to indicate a comparison result. Then the second local block feature $f_{3j}$ of the second image block illustrated in FIG. 2b may be indicated by FIG. 4b.

Figure 10:
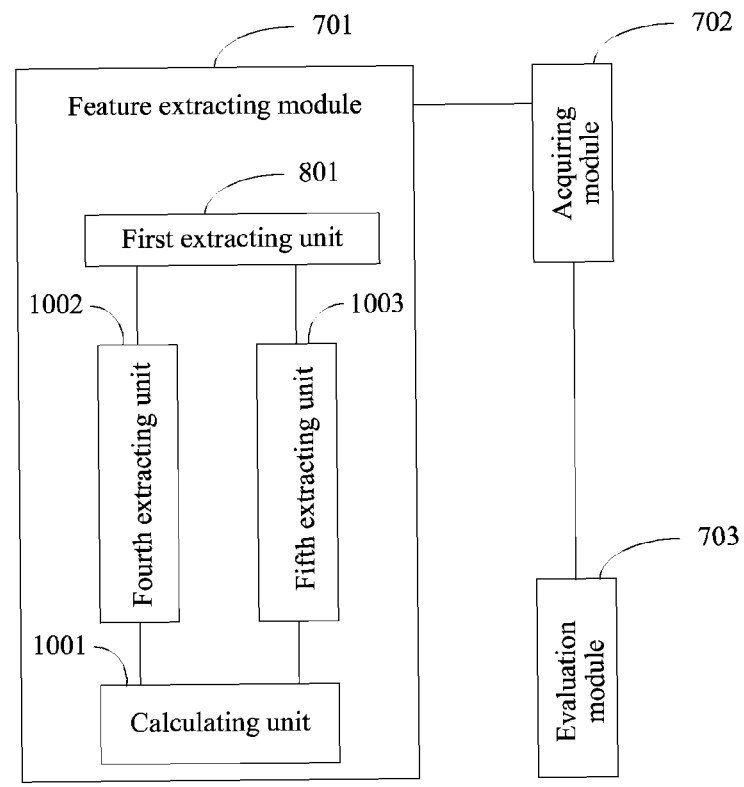
FIG. 10 is a schematic structural diagram of an apparatus for acquiring a weight coefficient of a digital filter according to another embodiment of the present invention.

For an image block that contains more pixels, if the feature extracting module 701 illustrated in FIG. 9 is still used to extract a global block feature and/or a local block feature, a larger number of bits are inevitably needed for indication and this is a kind of resource consumption. To save a resource and optimize an implementation manner, the feature extracting module 701 illustrated in FIG. 7 may further include a calculating unit 1001, a fourth extracting unit 1002, and a fifth extracting unit 1003, as shown in FIG. 10, which shows an apparatus for acquiring a weight factor of a digital filter according to another embodiment of the present invention.

The calculating unit 1001 is configured to calculate, by using a certain pixel among pixels contained in the first image block as a central pixel, average strength of pixels in each direction of the central pixel to obtain a first group of strength values; and calculate, by using a certain pixel among pixels contained in the second image block as a central pixel, average strength of pixels in each direction of the central pixel to obtain a second group of strength values.

The fourth extracting unit 1002 is configured to compare each strength value among the first group of strength values and the $f_{1i}$, and use two-valued logic "0"s or "1"s, obtained according to the result of the comparison, as a first local block feature $f_{2i}$ of the first image block; and compare each strength value among the second group of strength values and the $f_{1j}$, and use two-valued logic "0"s or "1"s, obtained according to the result of the comparison, as a first local block feature $f_{2j}$ of the second image block.

The fifth extracting unit 1003 is configured to determine whether an absolute difference between each strength value among the first group of strength values and the $f_{1i}$ is smaller than a first threshold, and use two-valued logic "0"s or "1"s, obtained through the determination, as a second local block feature $f_{3i}$ of the first image block; and determine whether an absolute difference between each strength value among the second group of strength values and the $f_{1j}$ is smaller than a second threshold, and use two-valued logic "0"s or "1"s, obtained through the determination, as a second local block feature $f_{3j}$ of the second image block.

For example, for the first image block illustrated in FIG. 2a, the calculating unit 1001 may calculate average strength of pixels in five directions by using a pixel whose strength value is 208 as a central pixel. That is, the calculating unit 1001 calculates average strength of two pixels adjacent to the pixel whose strength value is 208 in a 12 o'clock direction to obtain a strength value 131.5; calculates average strength of two pixels adjacent to the pixel whose strength value is 208 in a 3 o'clock direction to obtain a strength value 80.5; calculates average strength of two pixels adjacent to the pixel whose strength value is 208 in a 6 o'clock direction to obtain a strength value 157; and calculates average strength of two pixels adjacent to the pixel whose strength value is 208 in a 9 o'clock direction to obtain a strength value 80.5. FIG. 5a shows a first group of strength values of the first image block illustrated in FIG. 2a, where the first group of strength values of the first image block is obtained after the calculating unit 1001 performs calculation according to the five directions.

It should be noted that the calculating, by the calculating unit 1001 by using a certain pixel as a central pixel, average strength of pixels in each direction of the central pixel is not limited to the five directions illustrated in FIG. 5a, and other directions such as nine directions may also be selected according to a requirement for calculation precision of average strength; the more directions there are, the higher the precision of calculated average strength is.

After the calculating unit 1001 calculates, according to the five directions, the first group of strength values of the first image block illustrated in FIG. 2a, the fourth extracting unit 1002 may compare each strength value among the first group of strength values and the global block feature 116.2 of the first image block. If a strength value among the first group of strength values is larger than the global block feature 116.2 of the first image block, a two-valued logic "1" is used for indication. If a strength value among the first group of strength values is smaller than the global block feature 116.2 of the first image block, a two-valued logic "0" is used for indication. FIG. 5b is a schematic diagram of a first local block feature $f_{2i}$ of the first image block, where the first local block feature $f_{2i}$ of the first image block is obtained by the fourth calculating unit 1002 according to the illustration in FIG. 5a.

After the calculating unit 1001 calculates, according to the five directions, the first group of strength values of the first image block illustrated in FIG. 2a, the fifth extracting unit 1003 may determine whether an absolute difference between each strength value among the first group of strength values and the global block feature 116.2 of the first image block is smaller than the first threshold 16. If the absolute difference between a strength value among the first group of strength values and the global block feature 116.2 of the first image block is smaller than the first threshold 16, a two-valued logic "1" is used for indication. If the absolute difference between a strength value among the first group of strength values and the global block feature 116.2 of the first image block is larger than the first threshold 16, a two-valued logic "0" is used for indication. FIG. 5c is a schematic diagram of a second local block feature $f_{3i}$ of the first image block, where the second local block feature $f_{3i}$ of the first image block is obtained according to the illustration in FIG. 5a.

For another example, for the first image block illustrated in FIG. 2b, the calculating unit 1001 may calculate average strength of pixels in the five directions by using a pixel whose strength value is 230 as a central pixel. That is, the calculating unit 1001 calculates average strength of two pixels adjacent to the pixel whose strength value is 230 in the 12 o'clock direction to obtain a strength value 159.5; calculates average strength of two pixels adjacent to the pixel whose strength value is 230 in the 3 o'clock direction to obtain a strength value 93.5; calculates average strength of two pixels adjacent to the pixel whose strength value is 230 in the 6 o'clock direction to obtain a strength value 225.5; and calculates average strength of two pixels adjacent to the pixel whose strength value is 230 in the 9 o'clock direction to obtain a strength value 109.5. FIG. 6a shows a second group of strength values of the second image block illustrated in FIG. 2b, where the second group of strength values of the second image block is obtained after the calculating unit 1001 performs calculation according to the five directions.

After the calculating unit 1001 calculates, according to the five directions, the second group of strength values of the second image block illustrated in FIG. 2b, the fourth extracting unit 1002 may compare each strength value among the second group of strength values and the global block feature 131.72 of the second image block. If a strength value among the second group of strength values is larger than the global block feature 131.72 of the second image block, a two-valued logic "1" is used for indication. If a strength value among the second group of strength values is smaller than the global block feature 131.72 of the second image block, a two-valued logic "0" is used for indication. FIG. 6b is a schematic diagram of a first local block feature $f_{2j}$ of the second image block, where the first local block feature $f_{2j}$ of the second image block is obtained by the fourth calculating unit 1002 according to FIG. 6a.

After the calculating unit 1001 calculates the second group of strength values of the second image block illustrated in FIG. 2b according to the five directions, the fifth extracting unit 1003 may determine whether an absolute difference between each strength value among the second group of strength values and the global block feature 131.72 of the second image block is smaller than the second threshold 30. If the absolute difference between a strength value among the second group of strength values and the global block feature 131.72 of the second image block is smaller than the second threshold 30, a two-valued logic "1" is used for indication. If the absolute difference between a strength value among the second group of strength values and the global block feature 131.72 of the second image block is larger than the second threshold 30, a two-valued logic "0" is used for indication. FIG. 6c is a schematic diagram of a first local block feature $f_{3j}$ of the second image block, where the first local block feature $f_{3j}$ of the second image block is obtained by the fifth calculating unit 1003 according to the illustration in FIG. 6a.

Figure 11A:
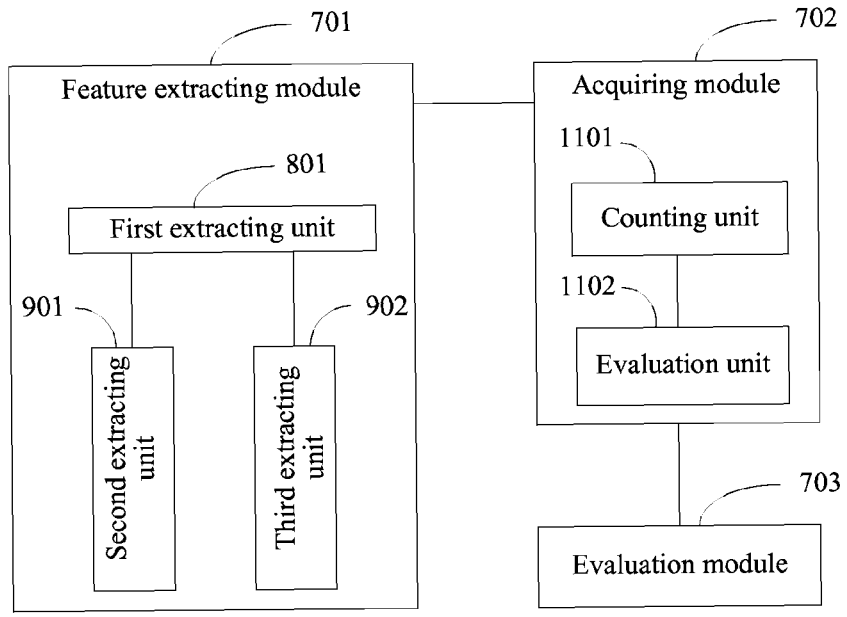
FIG. 11a is a schematic structural diagram of an apparatus for acquiring a weight coefficient of a digital filter according to another embodiment of the present invention.
Figure 11B:
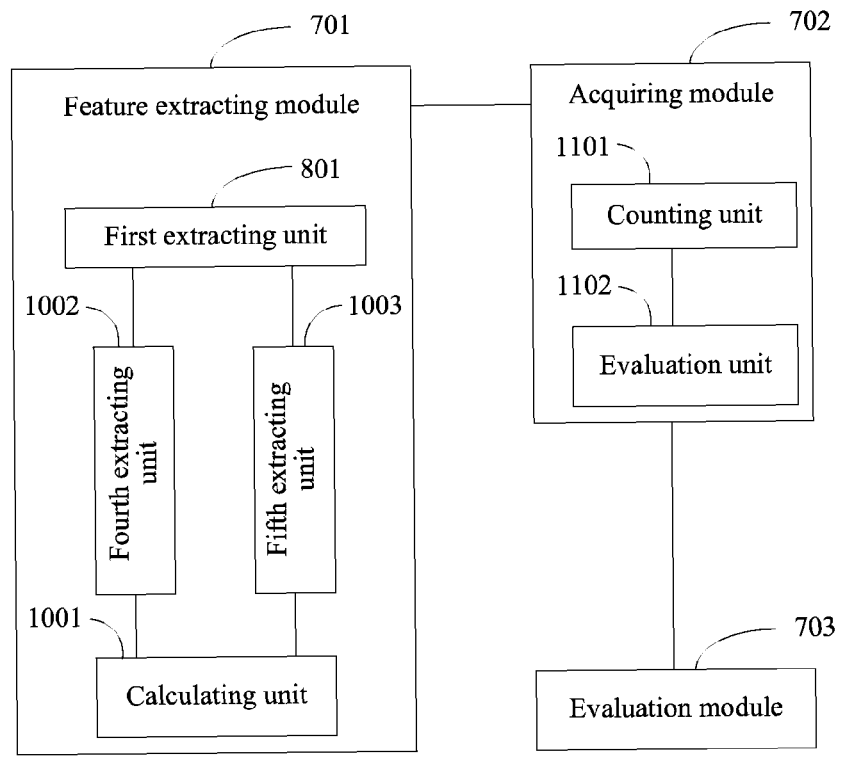
FIG. 11b is a schematic structural diagram of an apparatus for acquiring a weight coefficient of a digital filter according to another embodiment of the present invention.

In the apparatus for acquiring a weight coefficient of a digital filter illustrated in FIG. 9 or FIG. 10, the acquiring module 702 may include a counting unit 1101 and an evaluation unit 1102, as shown in FIG. 11a or FIG. 11b, which shows an apparatus for acquiring a weight coefficient of a digital filter according to another embodiment of the present invention.

The counting unit 1101 is configured to calculate the number of two-valued logic "1"s $C_{bit}$ obtained after a relational operation $(f_{2i} \wedge f_{2j}) \& (f_{3i}|f_{3j})$ is performed on the $f_{2i}$, the $f_{2j}$, the $f_{3i}$, and the $f_{3j}$.

The evaluation unit 1102 is configured to evaluate a product of $|f_{1i}-f_{1j}|$ and $C_{bit}$, and use the product as the image block distance $f_s$ between the first image block and the second image block, where $|f_{1i}-f_{1j}|$ indicates an absolute value of $f_{1i}-f_{1j}$.

An image block distance is a parameter used to represent the degree of similarity between two image blocks in content. A shorter image block distance indicates that the two image blocks are more similar. In the prior art, a European method for calculating an image block distance is used to calculate an image block distance. That is, a sum of squares of differences between strength values of all pixels of one image block and strength values of corresponding pixels of the other image block is calculated. The European method for calculating an image block distance is highly complex, consumes a large number of resources, and results in a high cost when it is directly implemented. In addition, when the European method for calculating an image block distance is used to calculate a weight coefficient of a digital filter, an exponential operation and a large divisor operation are involved, thereby bringing calculation complexity.

What is different from the prior art is that, in the present invention, when the image block distance between the first image block and the second image block is acquired, the following relational operation is first performed on the first local block feature $f_{2i}$ of the first image block, the first local block feature $f_{2j}$ of the second image block, the second local block feature $f_{3i}$ of the first image block, and the second local block feature of the $f_{3j}$ of the second image block, which are extracted in the illustration in FIG. 1:

$$(f_{2i} \wedge f_{2j}) \& (f_{3i}|f_{3j}) \qquad \text{Formula (1)}$$

where, "$\wedge$" indicates an "exclusive or" operation, "&" indicates an "and" operation, and "|" indicates an "or" operation. Then the counting unit 1101 calculates the number of two-valued logic "1"s in Formula (1), and the number of two-valued logic "1"s in Formula (1) is marked as $C_{bit}$.

As an embodiment of the present invention, when the counting unit 1101 calculates the number of two-valued logic "1"s in Formula (1), an instruction bitcnt( ) may be used for implementation. Running the instruction bitcnt( ) is actually counting the number of bits "1"s in an operand. In the embodiment of the present invention, $C_{bit}$=bitcnt$((f_{2i} \wedge f_{2j}) \& (f_{3i}|f_{3j}))$.

After the counting unit 1101 calculates the number of two-valued logic "1"s in $(f_{2i} \wedge f_{2j}) \& (f_{3i}|f_{3j})$, the evaluation unit 1102 further evaluates a product $|f_{1i}-f_{1j}| \times (f_{2i} \wedge f_{2j}) \& (f_{3i}|f_{3j})$ of $|f_{1i}-f_{1j}|$ and $C_{bit}$, and the product is used as the image block distance $f_s$ between the first image block and the second image block, where $|f_{1i}-f_{1j}|$ indicates an absolute value of $f_{1i}-f_{1j}$.

A CPU, an ARM, a GPU or the like may all finish executing the instruction bitcnt( ) in one clock period, and the large divisor operation and exponential operation are not involved. Therefore, a method for acquiring an image block distance provided by the embodiment of the present invention has very low complexity and may be implemented at a low cost on a chip and smart mobile phone software.

A weight coefficient $\omega_{ij}$ of the digital filter evaluated by the evaluation module 703 is expressed as follows:

$$\omega_{ij} = e^{-\frac{f_s}{\theta^2}} = e^{-\frac{|f_{1i}-f_{1j}| * (f_{2i} \wedge f_{2j}) \& (f_{3i}|f_{3j})}{\theta^2}} \qquad \text{Formula (2)}$$

In fact, Formula (2) is to convert the local features into an amplification factor of the image block distance, so that the image block distance contains the global block features and local block features of the image blocks, where e is a natural base number and may be a value such as 2.71828.

It should be noted that content such as processes of information exchange and execution between the modules or units of the foregoing apparatus is based on same thoughts as the method embodiment of the present invention and a technical effect brought by the apparatus is the same as that of the method embodiment of the present invention; for specific content, reference may be made to descriptions of the method embodiment of the present invention, and details are not repeated herein.

Persons skilled in the art may understand that all or part of the steps of the methods in the foregoing embodiments may be implemented by a program instructing relevant hardware, for example, all or part of the following steps of the methods:

extracting global block features and local block features of image blocks, where the image blocks include a first image block and a second image block, the first image block is an image block that currently a digital filter needs to process, and the second image block is an image block in which a neighborhood of the first image block lies;

acquiring an image block distance $f_s$ between the first image block and the second image block according to a global block feature and local block features of the first image block as well as a global block feature and local block features of the second image block; and evaluating a value of $$e^{-\frac{f_s}{\theta^2}}$$

and using the $$e^{-\frac{f_s}{\theta^2}}$$

as a weight coefficient of the digital filter, where the θ is a parameter of the digital filter.

Persons of ordinary skill in the art may understand that all or part of the steps of the methods in the embodiments may be implemented by a program instructing relevant hardware. The program may be stored in a computer readable storage medium, and the storage medium may include a read-only memory (ROM, Read Only Memory), a random access memory (RAM, Random Access Memory), a magnetic disk, an optical disk, or the like.

Detailed descriptions a method and an apparatus for acquiring a weight coefficient of a digital filter provided in the embodiments of the present invention are given above. Specific examples are used for illustrating the principles and embodiments of the present invention. The foregoing description about the embodiments is merely for understanding the methods and core ideas of the present invention. Meanwhile, persons of ordinary skill in the art may make modifications to the specific implementation manners and application scopes according to the idea of the present invention. In conclusion, the content of this specification should not be construed as a limitation on the present invention.

What is claimed is:

1. A method for acquiring a weight coefficient of a digital filter, the method comprising:

extracting global block features and local block features of image blocks, wherein the image blocks comprise a first image block and a second image block, the first image block is an image block that is being currently processed at the digital filter, and the second image block is an image block in a neighborhood of the first image block;

acquiring an image block distance $f_s$ between the first image block and the second image block according to a global block feature and local block features of the first image block as well as a global block feature and local block features of the second image block; and evaluating a value of $$e^{-\frac{f_s}{\theta^2}}$$

and using the $$e^{-\frac{f_s}{\theta^2}}$$

as a weight coefficient of the digital filter, wherein the θ is a parameter of the digital filter.

2. The method according to claim 1, wherein the extracting global block features of image blocks comprises:

calculating average strength $f_{1i}$ of the first image block and average strength $f_{1j}$ of the second image block, and using the $f_{1i}$ and the $f_{1j}$ as the global block feature of the first image block and the global block feature of the second image block, respectively.

3. The method according to claim 2, wherein the extracting local block features of image blocks comprises:

comparing a strength value of each pixel in the first image block and the $f_{1i}$, and using two-valued logic "0"s or "1"s, obtained according to the result of the comparison, as a first local block feature $f_{2i}$ of the first image block; and comparing a strength value of each pixel in the second image block and the $f_{1j}$, and using two-valued logic "0"s or "1"s, obtained according to the result of the comparison, as a first local block feature $f_{2j}$ of the second image block; and determining whether an absolute difference between the strength value of each pixel in the first image block and the $f_{1i}$ is smaller than a first threshold, and using two-valued logic "0"s or "1"s, obtained through the determination, as a second local block feature $f_{3i}$ of the first image block; and determining whether an absolute difference between the strength value of each pixel in the second image block and the $f_{1j}$ is smaller than a second threshold, and using two-valued logic "0"s or "1"s, obtained through the determination, as a second local block feature $f_{3j}$ of the second image block.

4. The method according to claim 2, wherein the extracting local block features of image blocks comprises:

calculating, by using a certain pixel among pixels contained in the first image block as a central pixel, average strength of pixels in each direction of the central pixel to obtain a first group of strength values; and calculating, by using a certain pixel among pixels contained in the second image block as a central pixel, average strength of pixels in each direction of the central pixel to obtain a second group of strength values;

comparing each strength value among the first group of strength values and the $f_{1i}$, and using two-valued logic "0"s or "1"s, obtained according to the result of the comparison, as a first local block feature $f_{2i}$ of the first image block; and comparing each strength value among the second group of strength values and the $f_{1j}$, and using two-valued logic "0"s or "1"s, obtained according to the result of the comparison, as a first local block feature $f_{2j}$ of the second image block; and determining whether an absolute difference between each strength value among the first group of strength values and the $f_{1i}$ is smaller than a first threshold, and using two-valued logic "0"s or "1"s, obtained through the determination, as a second local block feature $f_{3i}$ of the first image block; and determining whether an absolute difference between each strength value among the second group of strength values and the $f_{1j}$ is smaller than a second threshold, and using two-valued logic "0"s or "1"s, obtained through the determination, as a second local block feature $f_{3j}$ of the second image block.

5. The method according to claim 3, wherein the acquiring an image block distance $f_s$ between the first image block and the second image block according to a global block feature and local block features of the first image block as well as a global block feature and local block features of the second image block comprises:

calculating the number of two-valued logic "1"s $C_{bit}$ obtained after a relational operation $(f_{2i} \wedge f_{2j}) \& (f_{3i} | f_{3j})$ is performed on the $f_{2i}$, $f_{2j}$, $f_{3i}$, and $f_{3j}$; and evaluating a product of $|f_{1i}-f_{1j}|$ and $C_{bit}$, and using the product as the image block distance $f_s$ between the first image block and the second image block, wherein $|f_{1i}-f_{1j}|$ indicates an absolute value of $f_{1i}-f_{1j}$.

6. An apparatus for acquiring a weight coefficient of a digital filter, the apparatus comprising a computer including a non-transitory computer-readable medium storing program modules executable by the computer, the modules including:

a feature extracting module, configured to extract global block features and local block features of image blocks, wherein the image blocks comprise a first image block and a second image block, the first image block is an image block that currently a digital filter needs to process, and the second image block is an image block in which a neighborhood of the first image block lies;

an acquiring module, configured to acquire an image block distance $f_s$ between the first image block and the second image block according to a global block feature and local block features of the first image block as well as a global block feature and local block features of the second image block; and an evaluation module, configured to evaluate a value of $$e^{-\frac{f_s}{\theta^2}}$$

and use the $$e^{-\frac{f_s}{\theta^2}}$$

as a weight coefficient of the digital filter, wherein the θ is a parameter of the digital filter.

7. The apparatus according to claim 6, wherein the feature extracting module comprises:
a first extracting unit, configured to calculate average strength $f_{1i}$ of the first image block and average strength $f_{1j}$ of the second image block, and use the $f_{1i}$ and the $f_{1j}$ as the global block feature of the first image block and the global block feature of the second image block, respectively.

8. The apparatus according to claim 7, wherein the feature extracting module further comprises:
a second extracting unit, configured to compare a strength value of each pixel in the first image block and the $f_{1i}$, and use two-valued logic "0"s or "1"s, obtained according to the result of the comparison, as a first local block feature $f_{2i}$ of the first image block; and compare a strength value of each pixel in the second image block and the $f_{1j}$, and use two-valued logic "0"s or "1"s, obtained according to the result of the comparison, as a first local block feature $f_{2j}$ of the second image block; and
a third extracting unit, configured to determine whether an absolute difference between the strength value of each pixel in the first image block and the $f_{1j}$ is smaller than a first threshold, and use two-valued logic "0"s or "1"s, obtained through the determination, as a second local block feature $f_{3i}$ of the first image block; and determine whether an absolute difference between the strength value of each pixel in the second image block and the $f_{1j}$ is smaller than a second threshold, and use two-valued logic "0"s or "1"s, obtained through the determination, as a second local block feature $f_{3j}$ of the second image block.

9. The apparatus according to claim 7, wherein the feature extracting module further comprises:
a calculating unit, configured to calculate, by using a certain pixel among pixels contained in the first image block as a central pixel, average strength of pixels in each direction of the central pixel to obtain a first group of strength values; and calculate, by using a certain pixel among pixels contained in the second image block as a central pixel, average strength of pixels in each direction of the central pixel to obtain a second group of strength values;
a fourth extracting unit, configured to compare each strength value among the first group of strength values and the $f_{1i}$, and use two-valued logic "0"s or "1"s, obtained according to the result of the comparison, as a first local block feature $f_{2i}$ of the first image block; and compare each strength value among the second group of strength values and the $f_{1j}$, and use two-valued logic "0"s or "1"s, obtained according to the result of the comparison, as a first local block feature $f_{2j}$ of the second image block; and
a fifth extracting unit, configured to determine whether an absolute difference between each strength value among the first group of strength values and the $f_{1i}$ is smaller than a first threshold, and use two-valued logic "0"s or "1"s, obtained through the determination, as a second local block feature $f_{3i}$ of the first image block; and determine whether an absolute difference between each strength value among the second group of strength values and the $f_{1j}$ is smaller than a second threshold, and use two-valued logic "0"s or "1"s, obtained through the determination, as a second local block feature $f_{3j}$ of the second image block.

10. The apparatus according to claim 8, wherein the acquiring module comprises:
a counting unit, configured to calculate the number of two-valued logic "1"s $C_{bit}$ obtained after a relational operation $(f_{2i} \wedge f_{2j}) \& (f_{3i} | f_{3j})$ is performed on the $f_{2i}$, the $f_{2j}$, the $f_{3i}$, and the $f_{3j}$; and
an evaluation unit, configured to evaluate a product of $|f_{1i}-f_{1j}|$ and $C_{bit}$, and use the product as the image block distance $f_s$ between the first image block and the second image block, wherein $|f_{1i}-f_{1j}|$ indicates an absolute value of $f_{1i}-f_{1j}$.

11. The apparatus according to claim 7,
wherein the feature extracting module is configured to extract global block features by calculating a first average strength of the first image block; and
wherein the feature extracting module is configured to extract local block features of image blocks by comparing a strength value of each pixel in the first image block and the first average strength, and using a result based on the comparing as a first local block feature of the first image block.

12. The apparatus according to claim 11, wherein the feature extracting module is further configured to extract local block features of image blocks by determining whether an absolute difference between the strength value of each pixel in the first image block and the first average strength is smaller than a first threshold, and using a result based on the determining as a second local block feature of the first image block.

13. The method according to claim 1,
wherein the extracting global block features of image blocks comprises calculating a first average strength of the first image block; and
wherein the extracting local block features of image blocks comprises:
comparing a strength value of each pixel in the first image block and the first average strength, and using a result based on the comparing as a first local block feature of the first image block.

14. The method according to claim 13, wherein the extracting local block features of image blocks further comprises determining whether an absolute difference between the strength value of each pixel in the first image block and the first average strength is smaller than a first threshold, and using a result based on the determining as a second local block feature of the first image block.

15. The method according to claim 13,
wherein the extracting global block features of image blocks further comprises calculating a second average strength of the second image block;
wherein the extracting local block features of image blocks further comprises:
comparing a strength value of each pixel in the second image block and the second average strength, and using a result based on the comparing as a first local block feature of the second image block.

16. The method according to claim 15, wherein the extracting local block features of image blocks further comprises determining whether an absolute difference between the strength value of each pixel in the second image block and the second average strength is smaller than a second threshold, and using a result based on the determining as a second local block feature of the second image block.

17. The method according to claim 1,
wherein the extracting global block features of image blocks comprises calculating a first average strength of the first image block; and
wherein the extracting local block features of image blocks comprises:
calculating, by using a certain pixel among pixels contained in the first image block as a central pixel, an average strength of pixels in each direction of the central pixel to obtain a first group of strength values; and
comparing each strength value among the first group of strength values and the first average strength, and using a result of the comparing, as a first local block feature of the first image block.

18. The method according to claim 17,
wherein the extracting global block features of image blocks comprises calculating a second average strength of the second image block; and
wherein the extracting local block features of image blocks comprises:
calculating, by using a certain pixel among pixels contained in the second image block as a central pixel, an average strength of pixels in each direction of the central pixel to obtain a second group of strength values; and
comparing each strength value among the second group of strength values and the second average strength, and using a result of the comparing, as a first local block feature of the second image block.

19. The method according to claim 1,
wherein the extracting global block features of image blocks comprises calculating a first average strength of the first image block; and
wherein the extracting local block features of image blocks comprises:
calculating, by using a certain pixel among pixels contained in the first image block as a central pixel, an average strength of pixels in each direction of the central pixel to obtain a first group of strength values; and
determining whether an absolute difference between each strength value among the first group of strength values and the first average strength is smaller than a first threshold, and using a result of the determining as a second local block feature of the first image block.

20. The method according to claim 19,
wherein the extracting global block features of image blocks comprises calculating a second average strength of the second image block; and
wherein the extracting local block features of image blocks comprises:
calculating, by using a certain pixel among pixels contained in the second image block as a central pixel, an average strength of pixels in each direction of the central pixel to obtain a second group of strength values; and
determining whether an absolute difference between each strength value among the second group of strength values and the second average strength is smaller than a second threshold, and using a result of the determining as a second local block feature of the second image block.

* * * * *